United States Patent
Brooks et al.

(10) Patent No.: US 11,181,108 B2
(45) Date of Patent: Nov. 23, 2021

(54) PLUNGER PUMP FLUID END

(71) Applicant: Advanced Upstream Solutions LLC, Houston, TX (US)

(72) Inventors: Bradley Allan Brooks, Magnolia, TX (US); Michael David Conatser, Stephenville, TX (US); Sean Christopher Cornett, Midland, TX (US); Rondall Bailey McKelroy, Tulsa, OK (US); Blake Mullins, Edmond, OK (US); Stephen Seymour, Edmond, OK (US)

(73) Assignee: Advanced Upstream Solutions, LLC, Houston, TX (US)

( * ) Notice: Subject to any disclaimer, the term of this patent is extended or adjusted under 35 U.S.C. 154(b) by 0 days.

(21) Appl. No.: 15/816,608

(22) Filed: Nov. 17, 2017

(65) Prior Publication Data

US 2019/0154033 A1   May 23, 2019

(51) Int. Cl.
| | |
|---|---|
| *F04B 53/10* | (2006.01) |
| *F04B 53/22* | (2006.01) |
| *F04B 7/00* | (2006.01) |
| *F04B 53/00* | (2006.01) |
| *F16K 15/02* | (2006.01) |

(52) U.S. Cl.
CPC ........ *F04B 53/1032* (2013.01); *F04B 7/0023* (2013.01); *F04B 53/007* (2013.01); *F04B 53/1025* (2013.01); *F04B 53/1087* (2013.01); *F04B 53/22* (2013.01); *F16K 15/026* (2013.01)

(58) Field of Classification Search
CPC .......... F04B 7/02; F04B 7/0266; F04B 53/10; F04B 53/102; F04B 53/1032; F04B 53/1025; F04B 53/1087; F04B 53/1085; F04B 53/007; F04B 53/22; F04B 1/00; F04B 1/04; F04B 1/0452–0465; F04B 7/0023; F16K 15/026
USPC .............................. 417/454; 137/535–543.23
See application file for complete search history.

(56) References Cited

U.S. PATENT DOCUMENTS

| | | | |
|---|---|---|---|
| 6,623,259 B1 | 9/2003 | Blume | |
| 7,954,510 B2 | 6/2011 | Schwegman | |
| 2007/0295411 A1* | 12/2007 | Schwegman | ......... F16K 15/063 137/542 |
| 2016/0258432 A1* | 9/2016 | Chandrasekaran | ... F04B 39/125 |
| 2017/0159655 A1* | 6/2017 | Morreale | ............... F04B 53/14 |
| 2018/0106399 A1* | 4/2018 | Freed | .................... F16L 15/006 |
| 2019/0072089 A1* | 3/2019 | Buckley | ............... F04B 1/0461 |
| 2020/0318626 A1* | 10/2020 | Erwin | ..................... F04B 39/14 |

* cited by examiner

*Primary Examiner* — Charles G Freay
*Assistant Examiner* — Chirag Jariwala
(74) *Attorney, Agent, or Firm* — Andrew P. Tower, Esq.

(57) ABSTRACT

A reciprocating plunger pump fluid end having increased material thicknesses in typical high stress concentration areas includes locating valves in spherically segmented shaped suction and discharge bores adjacent to chamfered transition areas to provide for reduced stress concentrations, resistance to fatigue failure and erosion and ease of access for maintenance. Among other features the housing includes a valve retainer assembly integrally mounted inside the housing which includes a profile to reduce stresses in the bores and facilitate access for replacement of internal components.

10 Claims, 10 Drawing Sheets

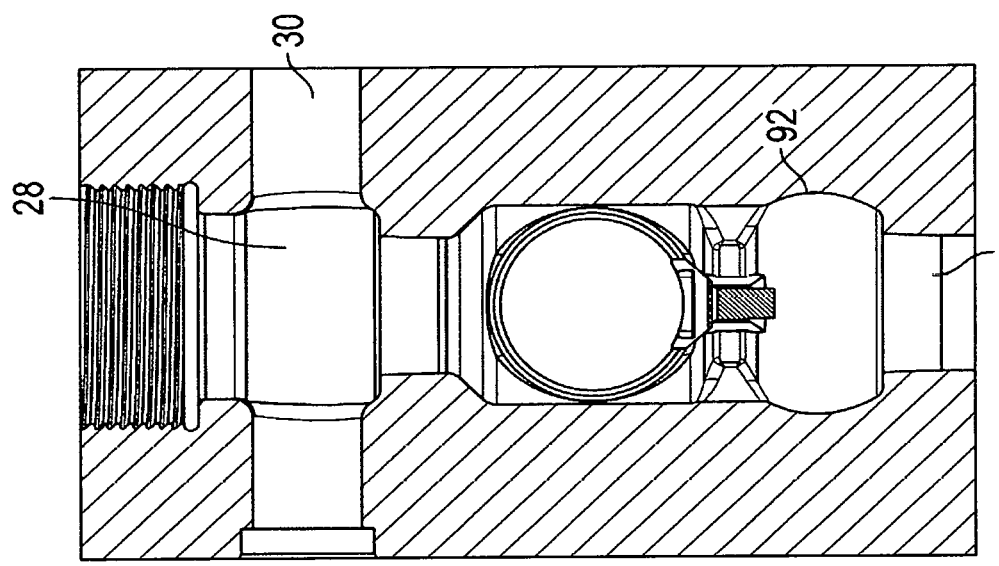
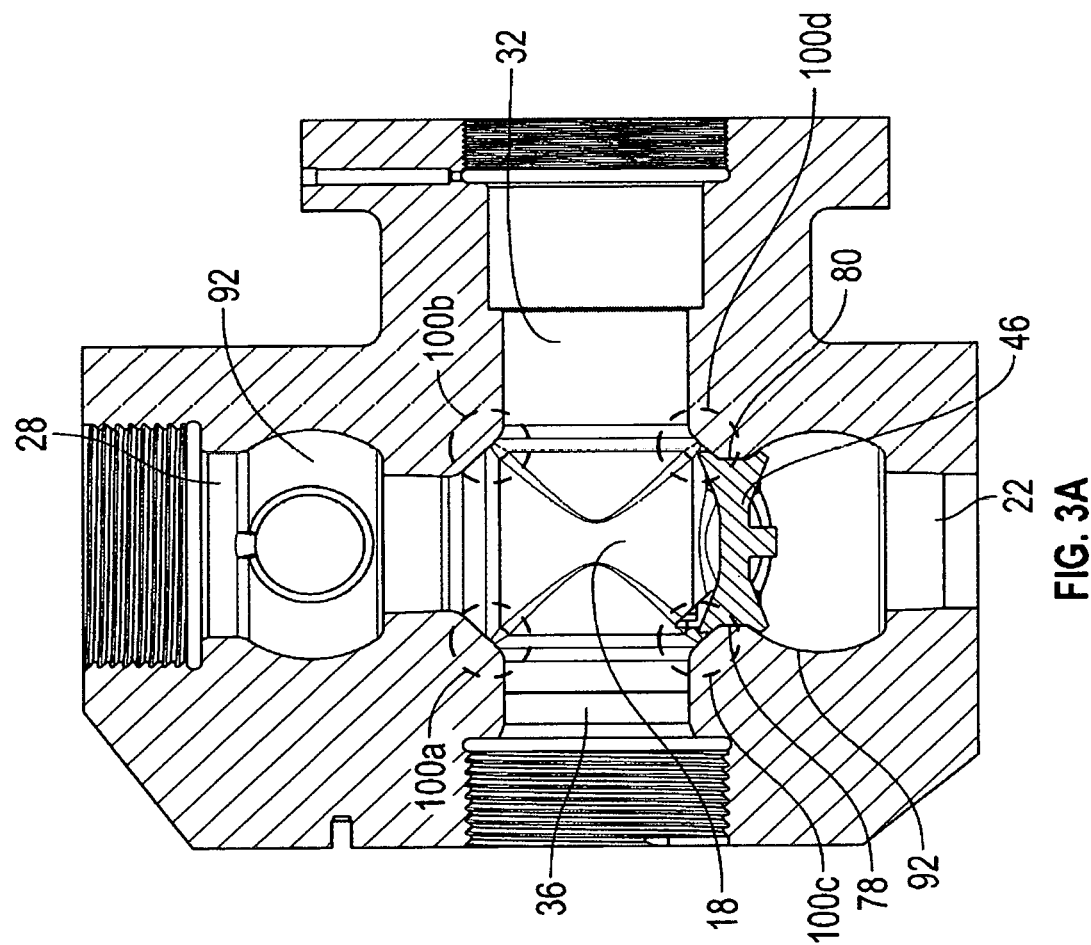
FIG. 3B
FIG. 3A

PLUNGER PUMP FLUID END

FIELD OF INVENTION

The disclosure relates generally to a fluid end housing for reciprocating plunger pumps used, for example, in oil field operations. More particularly, the invention relates to the design and certain internal components of a fluid end housing to reduce stress and fatigue failure, and to increase erosion resistance, durability, and to permit ease of access for maintenance. These novel design features include, among other things, improved bore geometries, an improved valve spring retainer or keeper, and improved access lock nut.

BACKGROUND

High-pressure pumps are used for a variety of oilfield and mining applications such as in hydraulic fracturing for oil and gas wells. Hydraulic fracturing or "fracing" involves pumping fracturing fluids (i.e. a combination of water, cement, mud, frac sand and other materials) at high pressure into the wellbores to cause a potentially producing formation to fracture. These types of pumps include a power end and a fluid end manifold. The power end of the pump uses a drive shaft to convert rotational power into the reciprocation of a plurality of plungers located in the pump housing or "fluid end," which includes a plurality of fluid chambers wherein the fracturing fluid is pressurized. The fluid end typically also includes a plurality of interconnected chambers, including a plurality of suction valve bores for receiving the pumping fluid, and corresponding discharge valve bores for discharging the fluid at high pressure, a plurality of plunger bores for receiving reciprocating plungers, and access bores providing access to the plunger bores for maintenance, all of which bores typically intersect in the vicinity of a series of fluid chambers.

Through the reciprocal action of the plungers, fracturing fluid is pressurized and flows into and out of the fluid end. As a plunger is pulled away from the fluid chamber during the suction stroke, the pressure inside the fluid chamber decreases, creating a differential pressure across a suction valve, causing it to open by overcoming the force generated by a suction valve spring, and allowing fluid to draw from a suction manifold and flow through the suction bore and into the fluid chamber. The suction valve remains open until the plunger travels distally from the fluid chamber to a position where the pressure differential causes the valve to return to a closed position. When the plunger changes direction and is pushed towards the fluid chamber, the pressure inside the chamber substantially increases until the differential pressure across a discharge valve causes it to overcome the force of a discharge valve spring and open, enabling the highly pressurized fracturing fluid to discharge through the outlet valve into the discharge port, and then onto the wellbore.

A common problem associated with operating these types of reciprocating pumps at alternating high and low pressures is fatigue failure in the fluid end, particularly in areas where because of internal geometries there are high stress concentrations, including areas near the fluid chambers and near the suction and discharge valves. Intersecting bores have shown to be one area of fluid end that experience some of the highest levels of stress during the pumps reciprocal operation. The area where the four bores previously described generally intersect at a fluid chamber experience excessive stresses and failures by fatigue cracks.

Fluid end failure frequently occurs when there is a stress fracture, followed by a washout between the discharge bore cavity and the pumping chamber. A fracture will frequently start at a localized stress area adjacent to the fluid chamber intersections. Once a fracture begins, with every pump cycle the fracture will propagate until the point at which it opens a path between the discharge cavity and the pump chamber. While the pressure in the discharge chamber is typically at well pressure, which may range from 9,000-13,000 psi or more, the pressure in pump chamber can be as low as 10 to 100 psi depending on the pumping cycle. This creates a high differential pressure allowing fluid to propagate through the discharge chamber and penetrate through the crack and into the chamber area where the plunger bore intersects with the suction and discharge bores (i.e. the "bore intersection" or "fluid chamber" area) ultimately eroding a pathway (effectively water-jetting material) between the pumping chamber and discharge cavity. This results in an enormous loss of pump efficiency. As the plunger in such a compromised fluid end draws back it draws in fluid from the discharge cavity and pushes it back out, resulting in a highly diminished pump output.

Another area of stress concentration, risk of fatigue cracking and erosion in fluid ends occurs near the valves. Each bore in the fluid end housing is subject to fatigue due to the pressures that occur during pump cycling. In addition, the circumferential areas of the fluid end housing across from the valve openings are prone to erosion risk due to high concentrations and velocities of fluid flow through the suction and discharge valves. Turbulent fluid flow patterns may lead to vibrations in the pump. These vibrations, as well as cratering or pitting of fluid end surfaces, are caused by intense fluid shock waves induced by implosion (i.e., rapid collapse) of cavitation nuclei that have been transiently enlarged due to internal fluid stress. Furthermore, fracking fluid travels at high pressures out of valves and erodes the walls of the bores. Because of the extremely harsh operating conditions imposed upon them, despite the best materials and designs, fluid end internals and housings must be frequently serviced and repaired or replaced.

Some prior attempts and improving fluid end designs for durability have focused on metal treatment to increase fatigue resistance. Other designs have also incorporated a re-design of the intersection bore to reduce stress. Prior art suction valve spring retainers have also included designs whereby the retainer is rotated to fit radially extending protrusions formed in the fluid end. For example, U.S. Pat. No. 6,623,259 to Blume discloses spring retainer assemblies for use in plunger pump housings that incorporate features for stress relief, including chamfers in the pump housing, and a spring retainer that fits on protrusions formed in the side wall of the suction bores and held in place by clamping to prevent rotation. U.S. Pat. No. 7,954,510 to Schwegman discloses a spring retainer rotated on protrusions in the suction bore and secured from rotation by means of a spring fitted with the retainer. Both of these prior art retainer configurations, however, include geometries, parts and orientations which create additional stresses within the suction bore that can require and reduce the life of the fluid end and pump and prove more difficult and time consuming to service.

Thus, there is continual need for improvements in designs to fluid ends to reduce fatigue failures, while also increasing erosion resistance, durability, and ease of access and reduction of time required for maintenance.

SUMMARY OF THE INVENTION

The preferred embodiment of the fluid end design of the present invention distributes peak applied stresses in a manner that reveals significantly improves durability over the typical industry fluid end. Test results with internal fluid end pressure at 15,000 psi indicate that peak stress reduction for the instant design translates into an improvement in fatigue life of the fluid end of over 200% when compared to a typical industry fluid end made of the same alloy materials. This increased life provides the instant design significant reductions in the rates of crack initiation and propagation. On a relative basis, the instant design's internal bore profile demonstrated peak stresses during testing that were 24.4% lower when compared to the typical industry design with identical material properties:

| Design Configuration | Peak 1$^{st}$ Principal Stress Results (psi) |
| --- | --- |
| Industry typical design using 4330 v mod alloy steel | 63,631 |
| Industry typical design using 17-4PH/15-5PH H1150 stainless steel | 63,453 |
| Instant design using 4330 v mod alloy steel | 48,078 |
| Instant design using 17-4PH/15-5PH H1150 stainless steel | 47,928 |

The table below sets forth the relative differences of crack propagation for the foregoing designs and materials. The test results show that the fluid end design of the present invention should achieve over a 200% increase in operational life based on the improved design profile alone. Utilization of the stainless-steel alloy on the industry typical design results in a 194% increase in operational life when compared to an alloy steel. However, test results show that use of stainless steel alloy with the present invention results in over a 400% increase in operational life when compared to an alloy steel.

| Design Configuration | Cycles to crack length of 5 mm. | Relative Difference |
| --- | --- | --- |
| Industry typical design using 4330 v mod alloy steel | 69,035 | — |
| Industry typical design using 17-4PH/15-5PH H1150 stainless steel | 134,001 | 194% |
| Instant design using 4330 v mod alloy steel | 147,001 | 213% |
| Instant design using 17-4PH/15-5PH H1150 stainless steel | 279,001 | 404% |

On triplex and quintuplex pumps, fluid end failure predominantly occurs in the outer bores (i.e. bores 1 and 3, or 1 and 5, respectively). In one aspect of the present invention, the design profile adds additional wall thickness to the sides of the fluid end to reduce stress in the more stress-susceptible bores.

In addition to directly reducing stress concentrations in the fluid end, the present invention simplifies certain fluid end structural features needed for installation and replacement of the suction valve with its spring and suction valve spring retainer, as well as installation and replacement and installation of the plunger and plunger packing.

In another aspect of the invention, the improved design reduces the stress concentrations at bore intersections through removing material, chambering and tapering, and thus, the reducing resulting fatigue failures that occur due to the alternating high and low pressures in the fluid chamber during reciprocal action of the plunger cycle.

Another aspect of the invention includes an improved valve retainer assembly oriented parallel to the plunger bore, providing stress relief to the fluid end and providing for improved maintenance and servicing of the fluid end.

The present invention's retainer design overcomes the inefficiencies and stress concentrations with prior art suction valve retainers. For example, the common industry "wing-style" suction valve retainer removes material from the suction bore and plunger bore interface in order to hold the retainer. This creates high stresses at some of the most critical areas of fluid end. The present invention takes an opposite approach, adding material back to the block around the internal circumference of the suction bore adjacent to the plunger bore intersection. Accordingly, material is added to the fluid end block around the 12 o'clock and 6 o'clock positions in the to the circumferential interface perpendicular to the suction bore. The 6 o'clock position perpendicular to plunger bore interface is one area most vulnerable to high stress concentrations.

In another aspect of the invention, the valve retainer includes an improved means for preventing the retainer assembly from rotating once it is in position. In one exemplary embodiment, a retainer wedge provides means to prevent rotation of the valve retainer assembly once it is placed in position. The wedge as also provides a means to slidably engage and guide the plunger when it is removed and replaced during maintenance through the access bore.

In another aspect of the invention, the suction and discharge bores include spherically segmented cross-sectional areas, which more evenly disperse the fluid flow from each of the suction and discharge valves and which testing reveals reduce stresses, erosion and fatigue on the bore walls and transition areas. The profile of the fluid end bores located just above the suction and discharge valves in the present design has been bowled to eliminate sharp/blunt geometry and to reduce peak velocity of the fluid flow when leaving either the suction or discharge valves. This reduces erosion, which directly results in an increased life of the fluid end. Testing reveals that peak velocity magnitude of fluid flow is reduced by the present design. Computation fluid dynamics erosion analyses also show substantially higher amounts of erosion occurring in industry standard design in comparison to the instant design.

In another aspect of the invention, the design profile for the fluid end can be retro-fitted into existing bridle setups that involve typical designs.

Another aspect of the invention includes a unique bore intersection profile created to reduce stress and increase fatigue resistance. The design directly addresses the most common failure mode known in the industry. By eliminating the sharp edge features of the bore intersection and replacing them with curved or chamfered profiles. This reduces stress concentrations and distributes the stresses over a larger surface area within the fluid end. This inhibits crack formation and retards crack growth in the event a crack occurs.

In another aspect of the invention, the design utilizes smaller suction and discharge valves to permit an increase in wall thicknesses around the valve/seat area compared to prior art fluid ends. The additional wall thicknesses and smaller seat diameters also reduces stresses and increases overall life of the fluid end. In typical industry designs, standard the valve seats are sized according to plunger size. A preferred embodiment of the present invention's increase in wall thicknesses also reduces peak magnitude stresses, which reduces the likelihood of initiation of cracks and retards potential growth of cracks.

In another aspect of the invention, the access bore's suction cap and nut have been designed to reduce valve displacement time, strengthen the threads to prevent pullout, and improve the sealing ability between the cap and the fluid end. One embodiment of the present design incorporates 3 threads per inch (TPI) suction cap nut design that reduces the number of turns required by the operator during removal and installation of the nut in an effort to improve between-stage switch-out efficiency.

In another aspect of the invention, a preferred embodiment includes a custom thread that reduces stresses at the root of the threads by reducing the potential for thread pull-out and damage during operation. The design's suction cap is optimized to appreciably increase the sealing capability by removing material to increase the sealing pressure between the cap and fluid end by reducing the contact area.

Another aspect of the present invention reduces the effective stress applied on fluid ends of high pressure plunger pumps through structural modifications to mitigate the fatigue, erosion and stress.

These and other advantages of the present invention will be made apparent from the following detailed description, with reference to the accompanying drawings.

BRIEF DESCRIPTION OF THE DRAWINGS

The accompanying drawings facilitate an understanding of the various embodiments.

FIG. 3A illustrates a cross-section of the fluid end in FIG. 2 without the internal components for better depiction of the geometry.

FIG. 3B illustrates a side cross-section of the fluid end in FIG. 1 with respect to line AA without the internal components for better depiction of the geometry.

DETAILED DESCRIPTION OF THE EMBODIMENTS

Figure 1A:
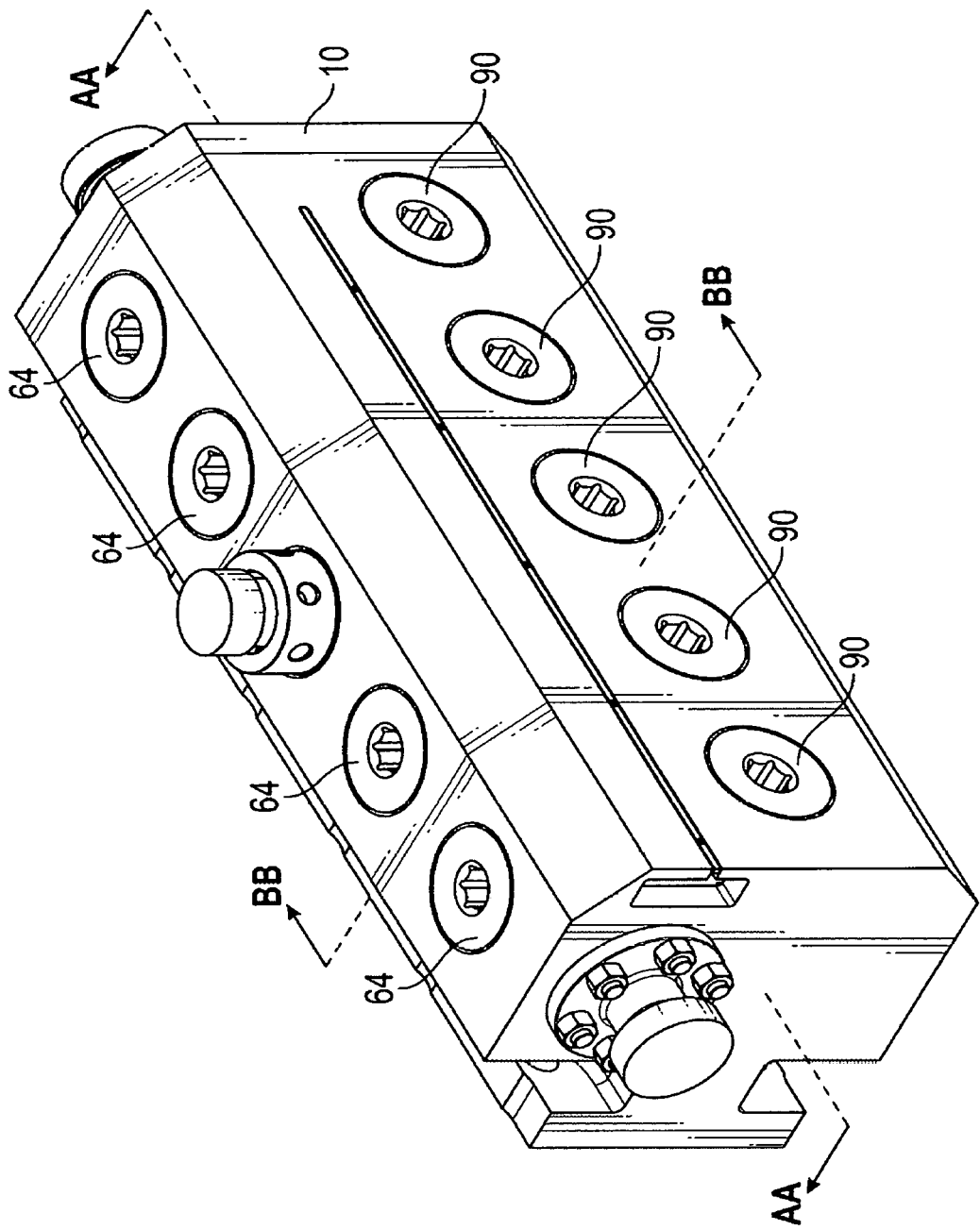
FIG. 1A is a perspective view of the fluid end housing of the present invention.

FIG. 1A is representative embodiment of a reciprocating plunger pump fluid end housing 10 of the present invention. Lines AA and BB are referenced for orientation purposes in additional drawings.

Figure 1B:
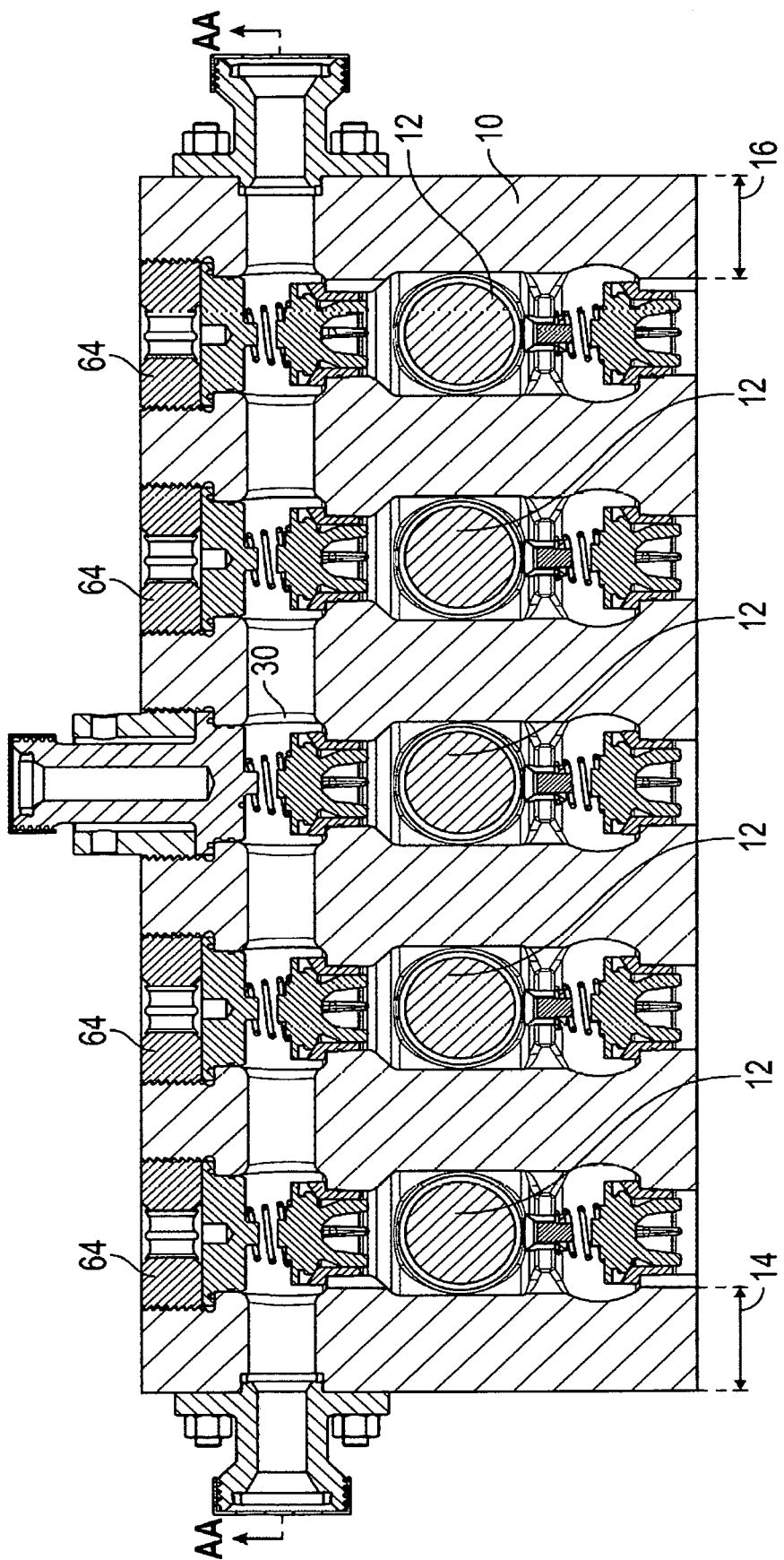
FIG. 1B is a cross-sectional view of the fluid end housing of the present invention perpendicular to line BB.

FIG. 1B is a cross-sectional view of the fluid end 10 of the present invention through line BB in FIG. 1. In the depicted embodiment, the fluid end 10 is a quintuplex pump, having five plunger cylinders 12. However, such pumps may have any appropriate number of cylinders, such as a three-cylinder pump (triplex pump). In one embodiment, the fluid end 10 has additional wall thickness to the sides (14 and 16) of the two outer cylinder bores 12 in comparison to corresponding areas in prior art fluid ends to reduce stress in the more stress vulnerable areas of the fluid end block. In the exemplary design in FIG. 1B the wall thickness at 14 and 16 is 4.25 in., compared to a typical industry standard 3.375 in.

Figure 2:
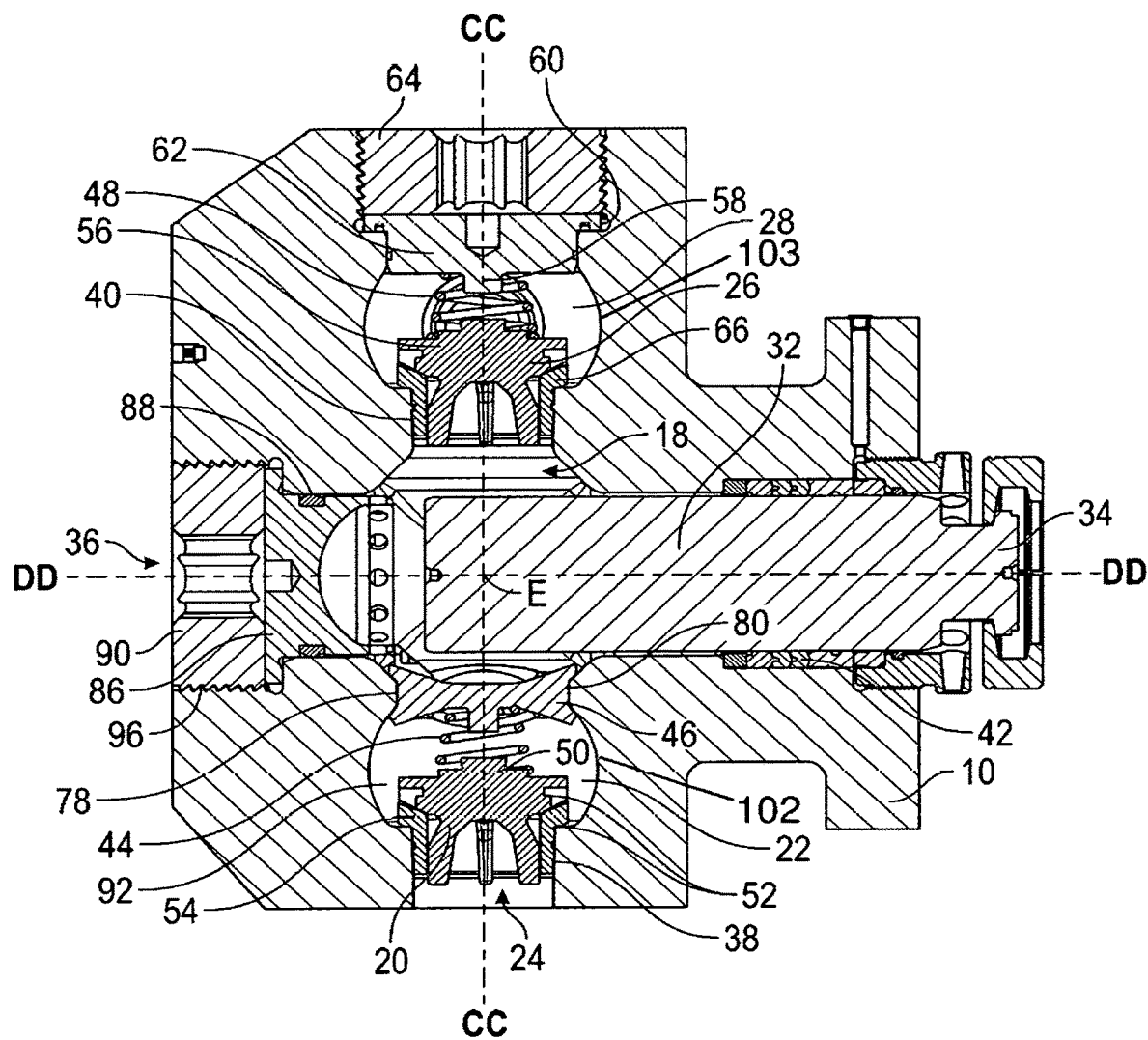
FIG. 2 is an enlarged side cross-sectional view of a representative bore and plunger assembly for the fluid end of FIG. 1 perpendicular to line AA.

FIG. 2 is an exemplary side cross-sectional view of a representative bore and plunger arrangement of the exemplary fluid end 10 of FIG. 1 perpendicular to line AA. The fluid end housing 10 includes one or more fluid chambers 18 (only one shown in the cross-section view as representative), which as explained in further detail below, are geometrically designed to reduce fatigue failure that occurs in the general vicinity of the fluid chamber 18. The exemplary design includes a suction valve 20 disposed in a suction bore 22 that draws fluid up from a suction manifold below 24, a discharge valve 26 disposed in a discharge bore 28 which discharges high pressure fluid out to a discharge port 30 (as shown in FIGS. 1B and 3B), a plunger bore 32 for housing a reciprocating plunger 34, and an access bore 36 to enable or otherwise facilitate maintenance access to the fluid end 10. The arrangement of the present invention is designed so that the suction valve bore 24 and the discharge valve bore 28 are collinear along a first centerline CC, and the plunger bore 12 and the access bore 18 are collinear along a second centerline DD. The two centerlines CC and DD are substantially perpendicular and generally intersect in the vicinity of the center-point E of the fluid chamber 22. Bore centerlines are used herein to assist the reader in understanding how the plurality of bores in the fluid end are spatially related and in their orientation with other fluid section components. According to embodiments disclosed herein, the diameter of the disclosed valve bores 22, 28, 32 and 36 may be less than, equal to, or greater than the diameters of the other valve bores.

The present invention shown in FIG. 2 uses smaller suction valves 20 and discharge valves 26 (in the exemplary case, #4 suction and discharge valves) compared to prior art fluid end designs in order to allow for increased wall thickness around the valve/seat areas 38 and 40 as shown in FIG. 2.

As shown in FIG. 2 the reciprocating plunger 34 is disposed in the plunger bore 32 and otherwise extends within the fluid chamber 18 and is sealed by a packing assembly 42 which is secured to the housing 10. The plunger is operatively connected to a power end (not shown) which provides the reciprocating motion to push and pull the plunger 34 through the plunger bore 32.

During operation, the suction valve 20 and discharge valve 26 are actuated by a predetermined differential pressure inside the fluid chamber 18. The suction valve 20 actuates to control fluid flow through the suction bore 22 and into the fluid chamber 18, and the discharge valve 26 positioned in the discharge bore manifold 28 actuates to control fluid flow through a discharge port 30 from the fluid chamber 18. In operation, the power end provides reciprocal motion to the plunger 34 to move it longitudinally toward and away from, the fluid chamber 18. As the plunger 34 moves longitudinally away from the chamber 18, the pressure of the fluid inside the fluid chamber 18 and suction bore 22 decreases, which creates a differential pressure across the suction valve 20. In the embodiment illustrated in FIG. 2, a biasing member 44 (e.g., a spring) is located between the suction valve 20 and a valve spring retainer assembly 46. The biasing member 44 maintains a specified pressure on the suction valve 20 thereby maintaining the suction valve 20 in a closed position until the differential pressure across suction valve 20 is sufficient to overcome the force generated by the biasing member 44. The pressure differential within the chamber 18 and suction bore 22 enables actuation of the valve 20 to allow the fluid to enter the chamber 18 from the suction manifold 24. The fluid is drawn within the fluid chamber 18 as the plunger 34 is pulled to move longitudinally away from fluid chamber 18 until the pressure difference between the fluid inside the chamber 18 and the fluid pressure inside the suction manifold 22 is small enough for the suction valve 20 to move to its closed position (via the biasing member 44 and/or pressure within the chamber 18 and suction bore 22). As the plunger 34 changes directions and moves longitudinally toward the fluid chamber 18, the fluid pressure inside the fluid chamber 18 increases. Fluid pressure inside the chamber 18 continues to increase as the plunger 34 approaches the chamber 18 until the differential pressure across the discharge valve 26 is large enough to actuate that valve (thereby compressing a second biasing member 48). This enables pumping fluid to exit the chamber 18 and discharge bore 28 via connected discharge port openings 30 (as shown in FIG. 1B).

The suction valve 20 is retained within the suction bore 22 by a valve retainer (or keeper) assembly 46 oriented parallel to the plunger bore and second centerline DD. The suction valve 20 comprises a disc-shaped body and an upper hub 50 which is movably engaged to suction valve biasing member 44. A seal ring 52 is engaged circumferentially around a corresponding valve seat which is formed on an upper end of a cylindrical seat member 54 that is secured such as by press fitting in a reduced diameter portion of the suction bore 22.

The discharge valve 26 also comprises a disc-shaped body and an upper hub 56 which is movably engaged to discharge valve biasing member 48 and oriented parallel to the plunger bore and second centerline CC. The top end of the biasing member 48 is engaged to a lower hub 58 on a discharge cover 60 which is sealed to the discharge bore 26 via a discharge cover D-Ring 62. The discharge cover 60 is further held in place by a threaded discharge cover retainer 64. The discharge valve 26 is engaged circumferentially around a corresponding valve seat which is formed on an upper end of a cylindrical seat member 66 that is secured such as by press fitting in a reduced diameter portion of the discharge bore 28.

Figure 7:
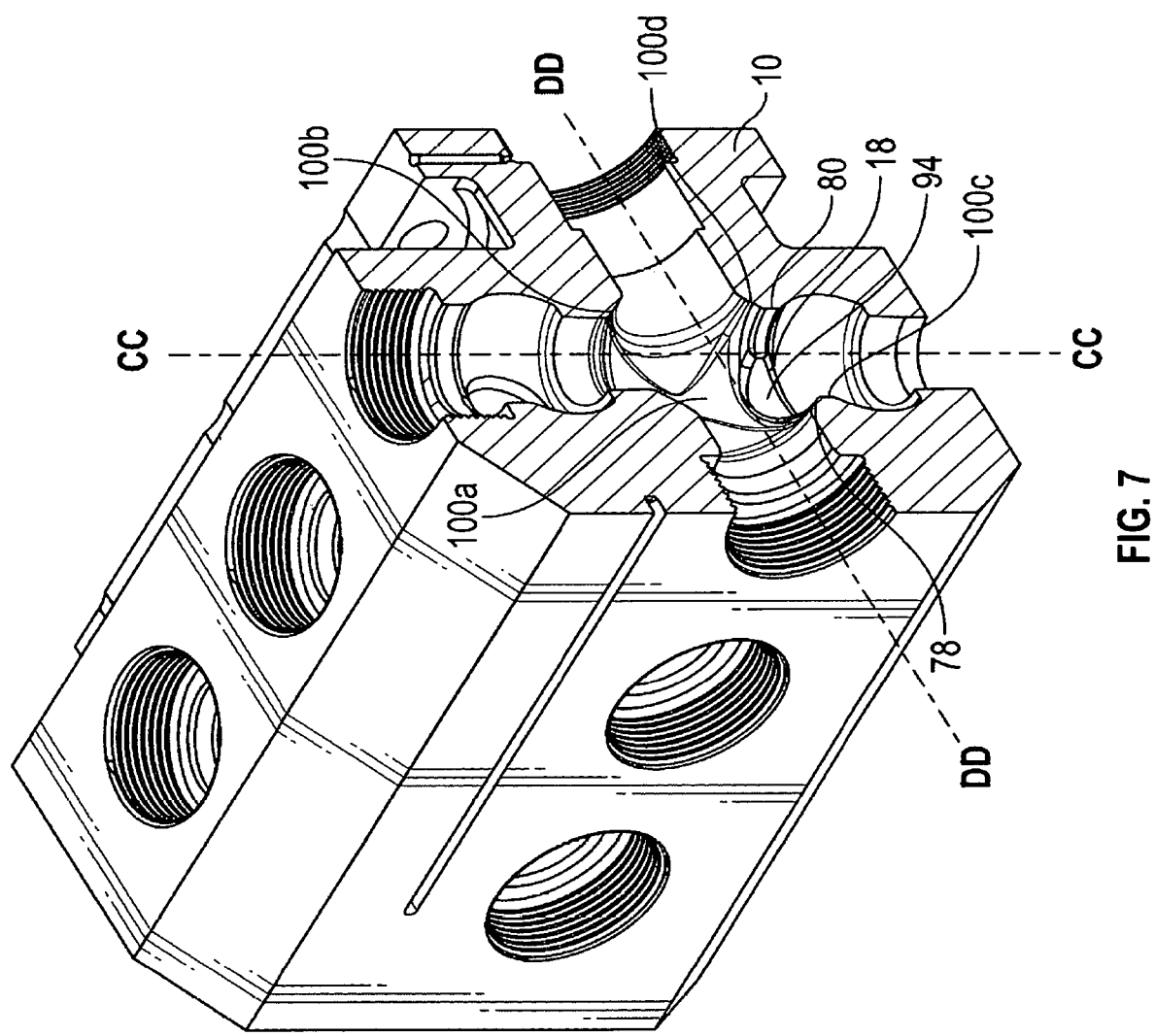
FIG. 7 is a perspective representation of the internal spaces represented by the present invention fluid end of FIGS. 3A and 3B.

Referring also to FIGS. 8A-8D, in one embodiment, the valve retainer assembly 46 comprises a retainer body 68, a retainer hub 70 and a retainer wedge 72. The retainer body 68 comprises at two peripheral channels formed 74 and 76 on each end. The channels 74 and 76 are designed to engage corresponding radial ridges 78 and 80 (as shown in FIGS. 2 and 7) which are formed in the suction bore 22 at a position near the fluid chamber 18 using any suitable machining technique such as conventional computer numerical control ("CNC") milling equipment. CNC equipment can be programmed to create virtually identical replicas of the design disclosed herein. Further, CNC machines do not require the same level of skill that a manual milling or grinding machine would require to produce the geometries of the present invention.

As shown in FIGS. 3A, 3B, 7 and 8A-D, each radial ridge 78 and 80 extends circumferentially around the suction bore a suitable distance, such as about 20-30 degrees, and are oriented in the 12 o'clock and 6 o'clock positions parallel to the plunger bore 32 and plunger bore centerline DD. Each ridge 78 and 80 has chamfered and beveled edges so as to engage the shape of the retainer's peripheral channels 74 and 76.

Each peripheral channel 74 and 76 is further defined by a pair of top outer rims 82 and bottom outer rims 84, between which, when inserted in the suction bore, a corresponding radial ridge 78 and 80 is confined to thereby prevent the valve retainer assembly 46, and thus the suction valve 20, from being displaced once inserted in the suction bore 22. Each top outer rim 82 and bottom outer rim 84 is angled such that the plane formed by the first top rim 82a and the second bottom rim 84b intersects the plane formed by the second top rim 82b and the first bottom rim 84a at a line FF running through the center of retainer head 68 as shown in FIGS. 8A-D.

In the embodiment shown in FIG. 2, the suction valve 20 is movably coupled to the valve retainer assembly 48 by a biasing member 44. Specifically, the reciprocal movement of the valve member 20 is biased by the biasing member 44, which is positioned over the retainer hub 70 between the retainer body 68 and the suction valve 20.

As one skilled in the art will appreciate, in the present design of the suction valve retainer assembly 46, by its orientation parallel to the plunger bore 32, and the angling, beveling and chamfering the radial ridges 78 and 80 and peripheral channels 74 and 76, as well as the orientation of the valve retainer top and bottom rims 82 and 84, reduces the stress state for the valve retainer assembly 46 during operation, as confirmed based upon finite element analysis ("FEA") and fluid flow analyses. The disclosed design also reduces overall stress concentrations in the suction valve bore 22 and on the valve retainer assembly 46 from known prior art designs with radial protrusions for interlocking valve spring retainers.

During assembly, maintenance and servicing of the fluid end 10, access to the plunger bore 32 and section valve bore 22 may be attained through the access bore 36. As shown in FIG. 2, in the closed state, the access bore 36 is sealed by an access bore suction retainer 86 with a suction cover D-Ring 88, which are secured in place in the access bore by a threaded access cover retainer 90. Access to the discharge bore 28 may also be attained through the threaded discharge cover retainer 64. Passage of various components through the opening in the suction bore 22 surrounded by the radial ridges 78 and 80 is facilitated because the bore opening defined by the ridges is ellipsoidal. In assembling the suction bore components from the access bore 36 the suction valve 20 is lowered down the suction bore 22 and seated onto the suction valve seat 54, which is mounted in a reduced diameter portion of the suction bore 22 below the spherically-segmented suction bore valve discharge area 92. After this seating of the suction valve 20, the valve retainer assembly 46 is next to be installed through the access bore and suction bore. The suction valve biasing member 44 is positioned over the retainer hub portion of the suction valve 50, and then the valve retainer assembly 46 is lowered into the suction bore 22 through the ellipsoidal opening 94 with the retainer assembly 46 perpendicular to the radial ridges 78 and 80 and the retainer hub 70 positioned on top of the suction valve biasing member 44. The valve retainer assembly 46 is then pressed down against the force of the biasing member 44 until the channels 74 and 76 are vertically aligned with the radial ridges 78 and 80. The valve retainer assembly 46 is then rotated to a lock position when the assembly 46 is substantially parallel with the centerline of the plunger bore DD, by turning it approximately 90° or until the radial ridges 78 and 80 are oriented between the upper rims 82 and lower rims 84.

In one embodiment as shown in FIGS. 8A-D, the valve retainer includes a novel means for preventing the valve assembly retainer 46 from rotating out of its lock position, due to vibration of fluid flow. Prior art anti-rotation means include pins and locking retainers that integrate with notches in the suction bore wall, causing stress concentrations in that area. In the preferred embodiment, the present invention's anti-rotation means comprises a retainer wedge 72 secured to the valve retainer body 68 by fastening means (such as with Loctite or screws) on the retainer body end positioned closest to the access bore 36 and distal from the plunger 34. The retainer wedge 72 provides a means to prevent rotation of the valve retainer assembly 46 once it is in position and the wedge abuts the suction retainer 86 when the access bore 36 is sealed and the suction cover retainer 90 is secured.

The present invention's access bore's suction cap 90 incorporates a 3 threads per inch (TPI) suction cap nut design that reduces the number of turns required by the operator during its removal and installation.

Figure 9:
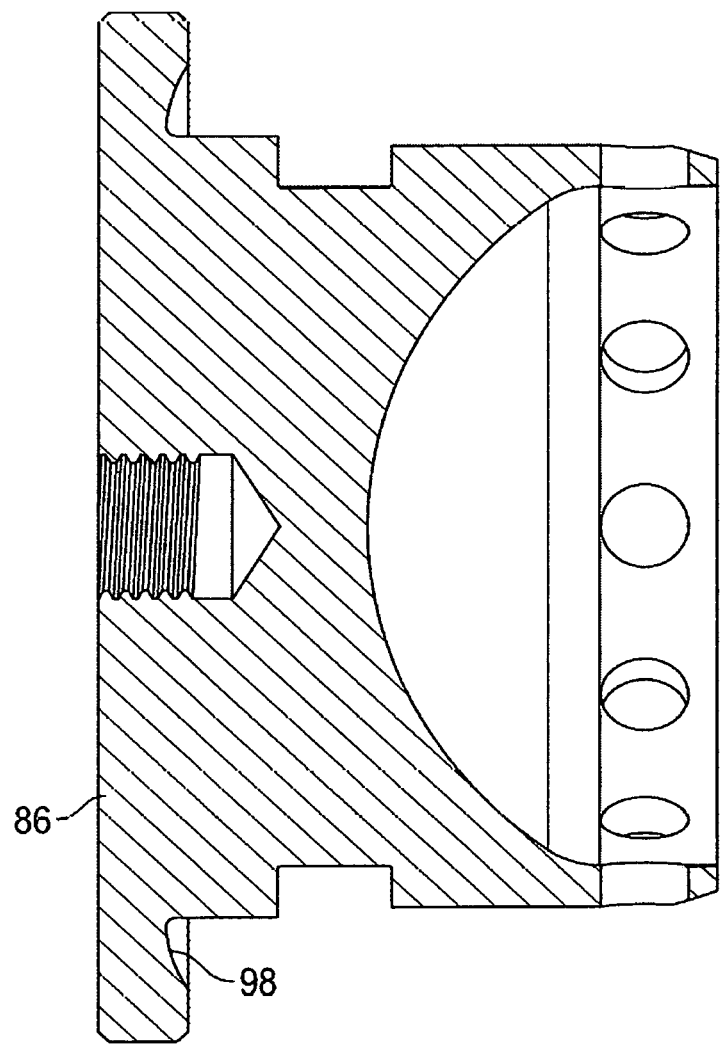
FIG. 9 is an enlarged side view of the suction retainer of the present invention as shown in FIG. 2.

As shown in FIG. 2 a custom thread 96 reduces stresses at the root of the threads. The suction cap 90 is customized further at the cut-out material section 98 to increase the sealing capability by increasing the sealing pressure between the suction cover retainer 90 and fluid end housing 10 by machining the suction retainer contact area 98 between the housing 10 and the suction cover retainer 86 as shown in FIG. 9.

Figure 8A:
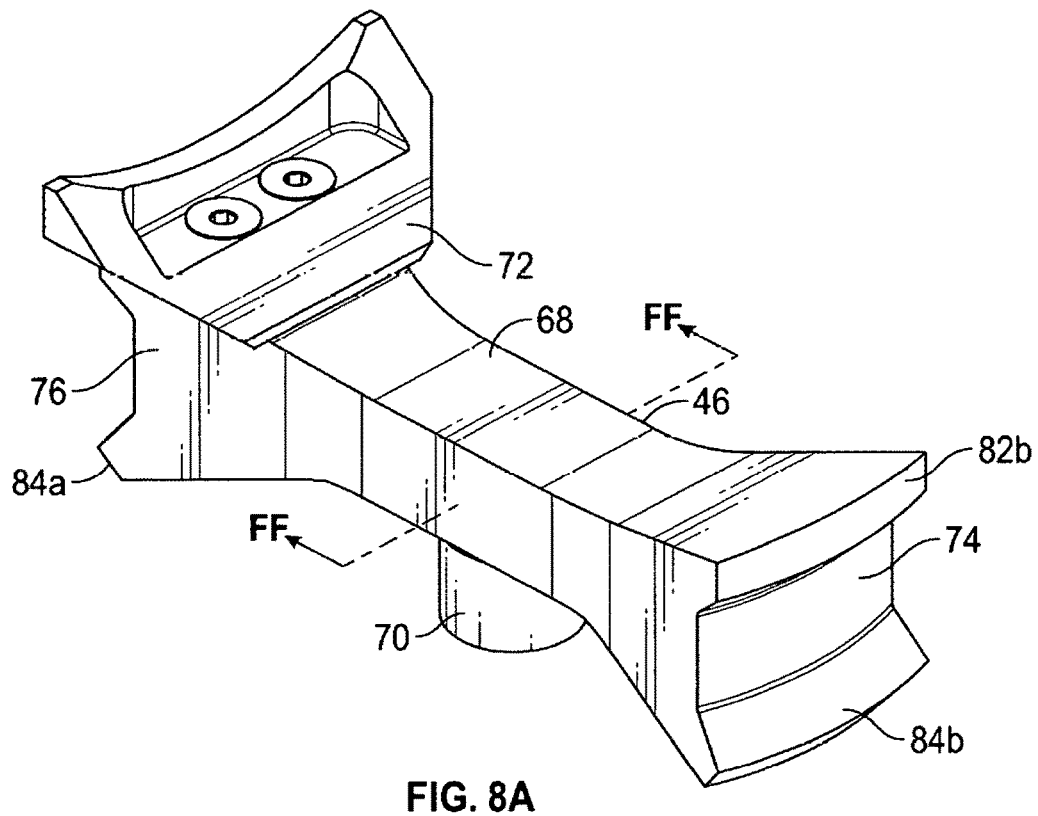
FIG. 8A is a perspective view of the valve retainer assembly of the present invention.
Figure 8B:
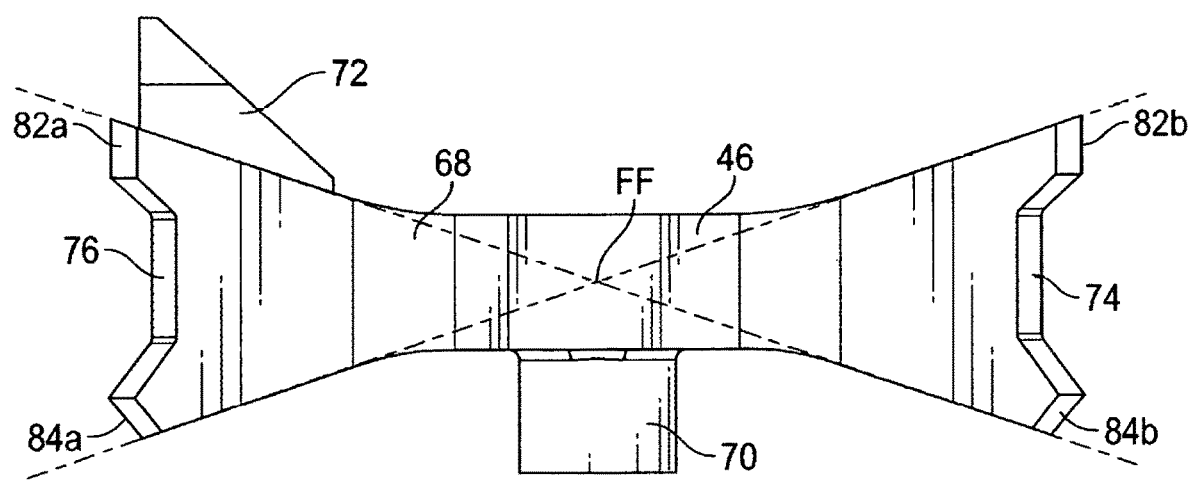
FIG. 8B is a side view of the valve retainer assembly of the present invention.
Figure 8C:
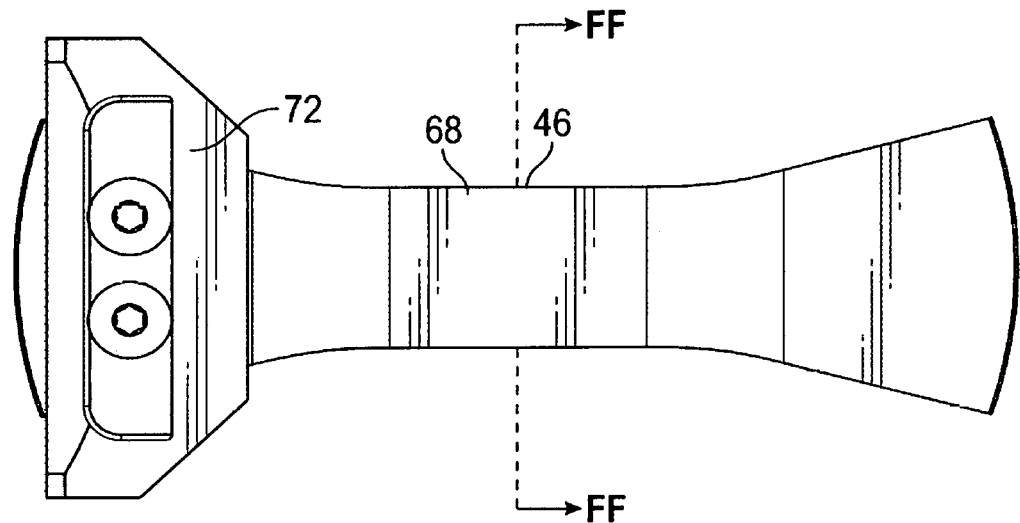
FIG. 8C is a top view of the valve retainer assembly of the present invention.
Figure 8D:
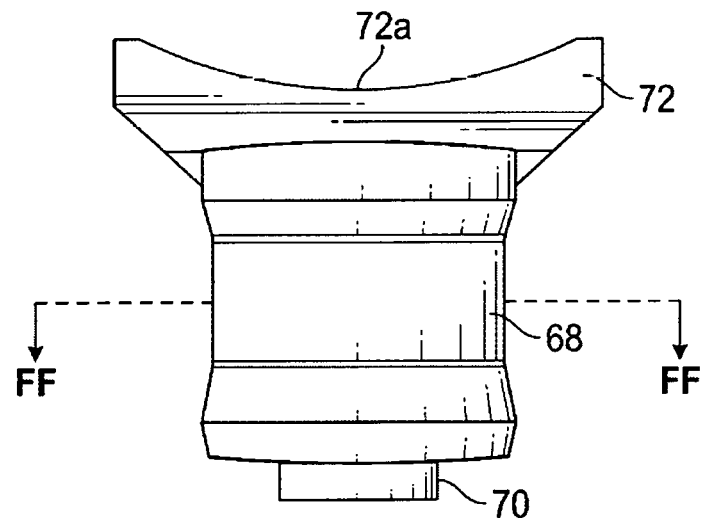
FIG. 8D is a side view of the valve retainer assembly of the present invention with respect to line DD in FIG. 8B.

Replacement of the plunger 34 and plunger packing 42 in the present design and other field maintenance is made relatively easier than in prior art designs. The wedge 72 further provides a means to slidably engage the plunger 34 when performing maintenance through the access bore 36, which reduces the likelihood that the plunger 34 may slip or be scratched or damaged when removing it for repair or service. As shown in FIGS. 8A and 8D, the wedge 72 comprises an arced top portion 72a substantially matching the circumferential arc of the plunger 34. During maintenance, the plunger 34 may be serviced by disengaging it from the packing 42 by use of suitable tools those familiar with the pumps would instantly recognize (not shown) and pulled out of the fluid end through the access bore 36. The wedge 72 thereby serves as a guide and support for the plunger as it is being withdrawn from the fluid end through the plunger bore 32 and out through the access bore 36.

The cross-bore intersections of the fluid end are commonly subjected to high stresses due to their geometries and high-pressure fluid flow around them. Prior art fluid designs teach that internal edges of the fluid chamber corresponding to intersections of the plunger, suction, discharge and access bores are chamfered or beveled to reduce stresses.

In preferred embodiments of the invention, these areas of intersection, referred to hereinafter as transition areas, between the fluid chamber 18 and the suction, discharge, plunger and access bores, 22, 28, 32 and 36 are shown on FIGS. 3A and 7 as 100a, 100b, 100c and 100d, and are chamfered to reduce stresses. As can be further seen, each transition area surface of 100a, 100b, 100c and 100d is perpendicular to an angular orientation adjacent to fluid chamber 18. It can be seen that without the chamfered transition areas as described, the volume of the fluid chamber 18 at the intersection of the bores prior to the chamfering of the fluid end body in the present design is substantially that of a Steinmetz solid (the shape formed when two equal diameter cylinders intersect each other perpendicularly), although in some embodiments the diameters of the intersecting bores may not be equal.

FIG. 7 illustrates that the transition area surfaces of 100a, 100b, 100c and 100d all have relatively smooth surface transitions to the respective bore intersections. Each such smooth transition area surface may be achieved by chamfering and smoothing techniques known to those skilled in the art (e.g., chamfering to a predetermined radius via CNC and grinding). Each resulting chamfered surface effectively increases any discrete angles of intersections among the suction, discharge, and cylinder bores. As used in the present application, a chamfer may preferably include a tapered portion of an oblong bore transition area to flare it out as it approaches a bore intersection, the transition from one bore to another thus being made even more nearly smooth.

Figure 4B:
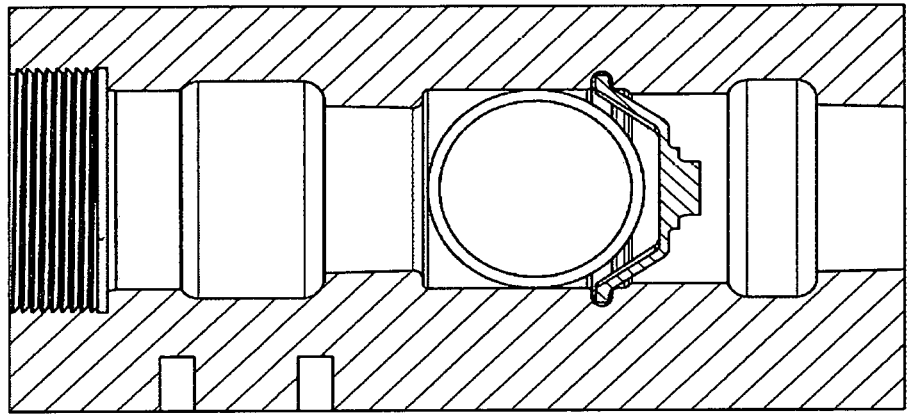
FIG. 4B illustrates another side cross-section of a prior art fluid end without the internal components.
Figure 4A:
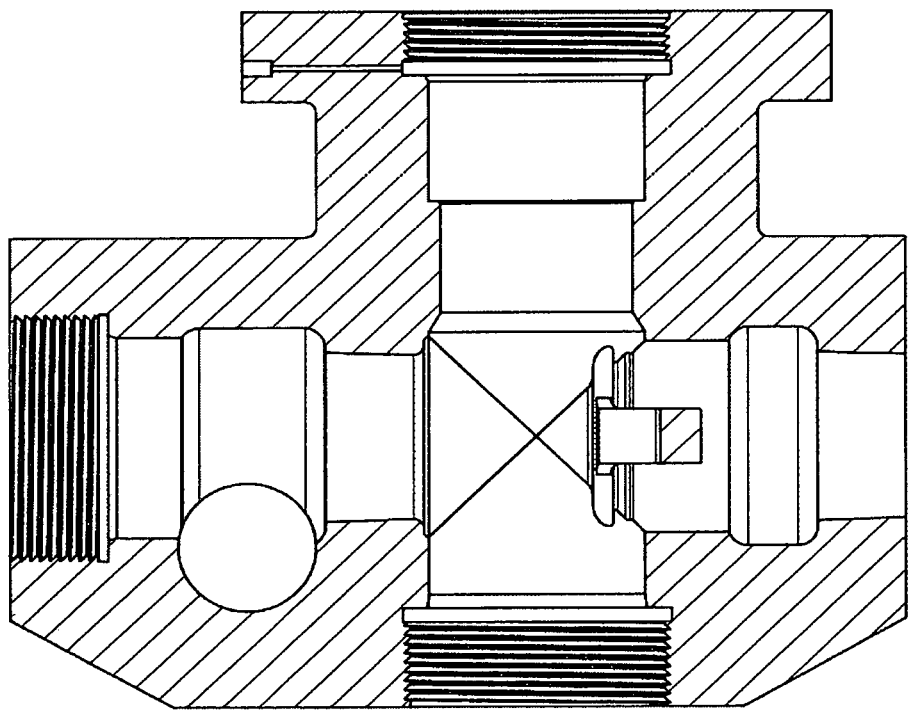
FIG. 4A illustrates a side cross-section of a prior art fluid end without internal components.
Figure 5:
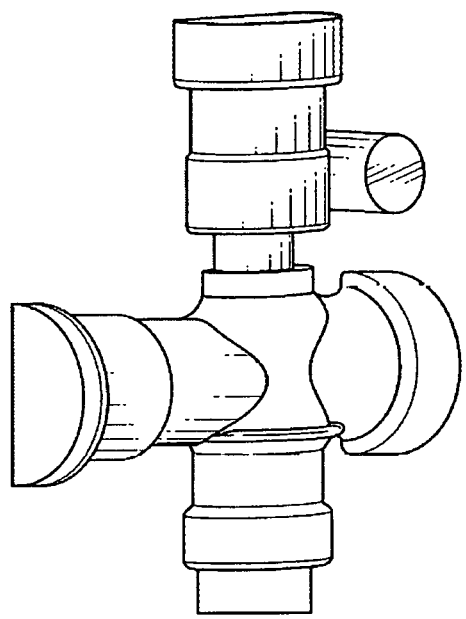
FIG. 5A is a perspective representation of the external geometry of the internal bore structures represented by the prior fluid end of FIGS. 4A and 4B.
Figure 6:
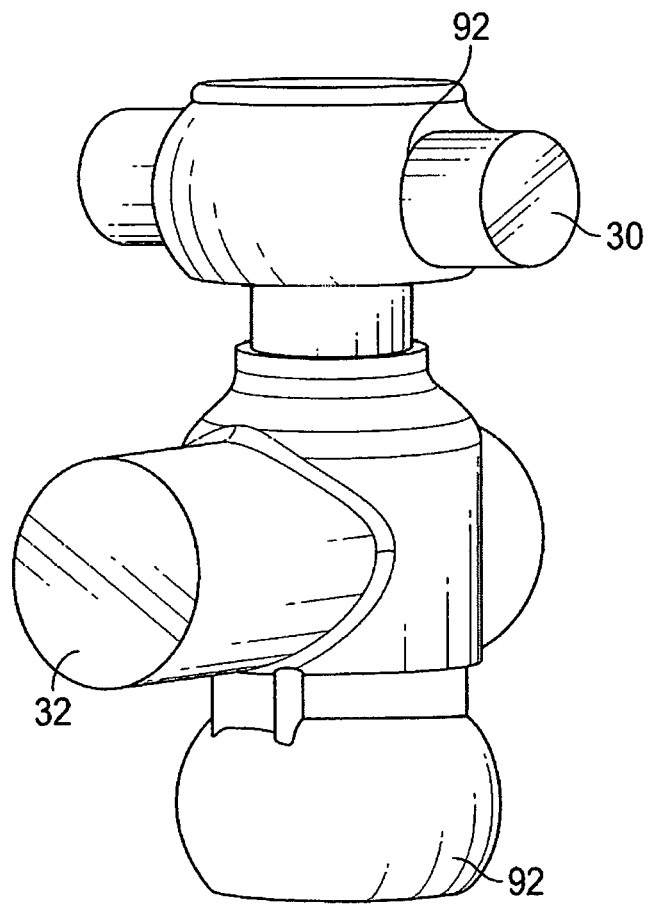
FIG. 6A is a perspective representation of the external geometry of the internal bore structures by the present invention fluid end of FIGS. 3A and 3B.

By contrast, as shown in FIGS. 4A, 4B and 6, prior art industry designs incorporate completely circular bores intersecting tend to concentrate stress areas at sharp edges where they intersect with other circular bores, with discrete angles of intersection being relatively smaller than in the present invention.

Radial ridges 78 and 80 extend outwardly adjacent to the transition areas 100a, 100b, 100c and 100d, which perform as the seats for the suction valve retainer assembly 44 as shown in FIGS. 2, 3A, 3B and 7. As is apparent to one skilled in the art, the stress and erosion potential state of the radial ridges 78 and 80 are higher than if the suction bore had a smooth vertical sidewall, based upon FEA. However, preferred embodiments of the present invention contain favorable stress-relieving geometrical design and orientation for the radial ridges 78 and 80 over prior art designs.

Turning now to the suction and discharge bore geometries, while generally cylindrical, as shown in FIGS. 2, 3A, 3B, 6 and 7, the suction bore 22 and discharge bore 28 in the present design each have portions with substantially spherically segmented shapes 102 and 103 in their bore areas surrounding the suction valve 20 and discharge valve 26, respectively, to optimize reduction of their respective stress state and erosion potential. Such spherical or howled shapes 102 and 103 of the suction bore 22 and discharge bore 28 in these areas has been shown by FEA and fluid flow analysis to reduce erosion and cavitation caused by the discharge of high velocity abrasive fluids exiting the suction valve 20 and discharge valve 26 in a "sandblasting" effect. The spherically segmented further reduce the erosion and stresses states located at the discharge port openings 30 that connect the discharge ports of the fluid end. The spherical bore geometries 102 and 103 of the referenced areas of the suction and discharge bores 22 and 28 additionally permit relatively easier and faster removal of components within the bores over the prior art designs.

One skilled in the art will appreciate that the spherical cross-bore geometry and circumferential transition surfaces and edges of the present invention can be created and machined through the use of CNC equipment that can be programmed to create virtually identical replicas of the design. Further, CNC machines do not require the same level of skill that a manual milling or grinding machine would require to produce the geometries of the present invention. Therefore, the present invention excludes the need to manually blend the edges within the cross-bore intersection through the use of manual grinding or requiring specialized equipment, although such could be utilized.

While embodiments of this invention can take many different forms, specific embodiments thereof are shown in the drawings and will be described herein in detail with the understanding that the present disclosure is to be considered as an exemplification of the principles of the invention, and is not intended to limit the invention to the specific embodiment illustrated.

What is claimed is:

1. A valve retainer assembly comprising:
a valve retainer body with a central axis which comprises:
a pair of channels capable of receiving ridges;
a hub which is connected to or formed integrally with said body,
wherein said pair of channels are defined by a first and second pair of upper and lower rims;
said first and second pair of upper and lower rims all having a top surface and a bottom surface, respectively;
wherein the top surface of the first upper rim and the bottom surface of the second lower rim are disposed in a first plane and the top surface of the second upper rim and the bottom surface of the first lower rim are disposed in a second plane, and
wherein said first and second planes intersect at the central axis of the valve retainer body.

2. A plunger pump fluid end housing comprising:
a suction valve bore and a discharge valve bore disposed along a first centerline;
wherein said suction valve bore and discharge valve bore each have a spherically segmented cross-section portion capable of accommodating a suction valve and a discharge valve, respectively;
a plunger bore and an access bore disposed along a second centerline, the second centerline perpendicular to the first centerline;
ridges formed on said suction valve bore parallel to said second centerline;
a valve retainer assembly, further comprising:
a valve retainer body with a central axis which comprises:
a pair of channels within which said ridges on said suction valve bore are received to thereby position the valve retainer body within said suction valve bore parallel to the second centerline;
a hub which is connected to or formed integrally with said valve retainer body, said hub movably coupled to said suction valve;
wherein said pair of channels is defined by a first and second pair of upper and lower rims; and
wherein said first and second pair of upper and lower rims have a top surface and a bottom surface, respectively; and
wherein the top surface of the first upper rim and the bottom surface of the second lower rim are disposed in a first plane and the top surface of the second upper rim and the bottom surface of the first lower rim are disposed in a second plane, and
wherein said first and second planes intersect at the central axis of the valve retainer body.

3. The plunger pump fluid end housing of claim 2, wherein said hub of the valve retainer assembly is movably coupled to the suction valve by a spring.

4. The plunger pump fluid end housing of claim 2, further comprising a means for preventing the valve retainer assembly from rotating when positioned within the suction bore in a plane parallel to the second centerline.

5. The plunger pump fluid end housing of claim 2, wherein said housing comprises a plurality of bores that correspond to a quintuplex or triplex pump; and
wherein said plurality of bores comprise a pair of outermost bores and one or more innermost bores, said one or more innermost bores being disposed between said pair of outermost bores; and
wherein said plurality of bores are further defined with respect to a plurality of wall thicknesses, including wall thicknesses of said pair of outermost bores abutting the outside perimeter of said plunger puma fluid end housing and wall thicknesses of said pair of outermost bores and one or more innermost bores between each other; and
wherein said wall thicknesses of said pair of outermost bores abutting the outside perimeter of said plunger pump fluid end housing is greater than the wall thicknesses of said pair of outermost bores and innermost bores between each other.

6. The plunger pump fluid end housing of claim 2, further comprising: said plunger displaced in said plunger bore, and said access bore sealed by an access bore cover member.

7. The plunger pump fluid end housing of claim 6, wherein said access bore further comprises a suction retainer cap and a less than four threads per inch suction retainer cap nut.

8. The plunger pump fluid end housing of claim 6, further comprising a suction bore retainer disposed in said access bore, wherein said suction bore retainer includes a reduced volume seating area.

9. The plunger pump fluid end housing of claim 6, further comprising a wedge member which is disposed on a top of the valve retainer assembly in a position to abut an access bore retainer disposed in said access bore.

10. The plunger pump fluid end housing of claim 9, wherein said plunger has a circular circumference; and
wherein said wedge member comprises an inwardly arced top portion which matches an outwardly arced portion of said circular circumference of said plunger.

* * * * *